US011803885B2

(12) United States Patent
Chapman et al.

(10) Patent No.: US 11,803,885 B2
(45) Date of Patent: Oct. 31, 2023

(54) CONFIGURATION FOR AUTHENTICATING A VIRTUAL ITEM

(71) Applicant: Disney Enterprises, Inc., Burbank, CA (US)

(72) Inventors: Steven Chapman, Thousand Oaks, CA (US); Edwin Rosero, Torrance, CA (US); Mehul Patel, Stevenson Ranch, CA (US); Joseph Popp, Cerritos, CA (US); Calis Agyemang, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 502 days.

(21) Appl. No.: 15/908,750

(22) Filed: Feb. 28, 2018

(65) Prior Publication Data

US 2019/0266650 A1   Aug. 29, 2019

(51) Int. Cl.
*G06Q 30/0601* (2023.01)
*H04L 9/06* (2006.01)
*H04L 9/32* (2006.01)
*H04L 9/00* (2022.01)

(52) U.S. Cl.
CPC ....... *G06Q 30/0609* (2013.01); *H04L 9/0643* (2013.01); *H04L 9/3239* (2013.01); *H04L 9/3247* (2013.01); *H04L 9/3263* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,102,526 | B1 * | 10/2018 | Madisetti | H04L 9/3239 |
| 10,867,057 | B1 * | 12/2020 | Knas | H04L 9/085 |
| 11,308,448 | B1 * | 4/2022 | Knas | H04L 63/10 |
| 2008/0301438 | A1 * | 12/2008 | Parkinson | H04L 9/3226 |
| | | | | 713/156 |
| 2012/0266256 | A1 * | 10/2012 | Kawachiya | A63F 13/12 |
| | | | | 726/26 |

(Continued)

FOREIGN PATENT DOCUMENTS

WO   WO-2015106509 A1 *   7/2015   ............ H04W 12/06

OTHER PUBLICATIONS

Cisa, Understanding Digital Signatures, Dec. 17, 2009, https://us-cert.cisa.gov/ncas/tips/ST04-018 (Year: 2009).*

*Primary Examiner* — Steven S Kim
*Assistant Examiner* — Jason B Fenstermacher
(74) *Attorney, Agent, or Firm* — Dorsey & Whitney LLP

(57) ABSTRACT

A process generates a certificate of authenticity for a virtual item. Further, the process sends, with the processor, the certificate of authenticity to a decentralized network of computing devices such that two or more of the computing devices store the certificate of authenticity. The two or more of the computing devices receive, from a user device that provides a virtual reality experience in which a virtual item is purchased, a request for authentication of the certificate of authenticity. In addition, the two or more computing devices authenticate the certificate of authenticity based on one or more consistency criteria for the certificate of authenticity being met by the two or more computing devices.

18 Claims, 8 Drawing Sheets

(56) References Cited

U.S. PATENT DOCUMENTS

| | | | |
|---|---|---|---|
| 2016/0034298 A1* | 2/2016 | Doane | G06Q 30/0601 |
| | | | 718/1 |
| 2017/0052676 A1* | 2/2017 | Pulier | G06F 3/04883 |
| 2017/0264428 A1* | 9/2017 | Seger, II | G06F 16/13 |
| 2018/0082043 A1* | 3/2018 | Witchey | G16H 10/60 |
| 2018/0108024 A1* | 4/2018 | Greco | H04L 9/0637 |
| 2019/0205889 A1* | 7/2019 | Cantrell | G06Q 20/38215 |
| 2019/0253256 A1* | 8/2019 | Saab | H04L 9/0637 |
| 2020/0162266 A1 | 5/2020 | Miller et al. | |

* cited by examiner

US 11,803,885 B2

CONFIGURATION FOR AUTHENTICATING A VIRTUAL ITEM

BACKGROUND

1. Field

This disclosure generally relates to the field of authentication. More particularly, the disclosure relates to a configuration for authenticating a virtual item.

2. General Background

The authenticity of real-world collectors' items (e.g., paintings, sculptures, etc.) is typically established by documenting the ownership history of the item in question. Various forms of proof may be used to establish such ownership history, but are somewhat questionable in a real-world environment and are often far more difficult to obtain in a virtual environment. Further, in a virtual environment where electronic duplication is significantly faster than a real-world environment, authenticating an artist's work is even more difficult.

SUMMARY

In one aspect, a computer program product comprises a non-transitory computer readable storage device having a computer readable program stored thereon. The computer readable program when executed on a computer causes the computer to generate, with a processor, a certificate of authenticity for a virtual item. Further, the computer readable program when executed on the computer causes the computer to send, with the processor, the certificate of authenticity to a decentralized network of computing devices such that two or more of the computing devices store the certificate of authenticity, receive, from a user device that provides a virtual reality experience in which a virtual item is purchased, a request for authentication of the certificate of authenticity, and authenticate the certificate of authenticity based on one or more consistency criteria for the certificate of authenticity being met by the two or more computing devices.

In another aspect, an apparatus has a processor that performs the functionality of the computer readable program. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration for authenticating authorship and/or origin of a virtual item is provided. The configuration allows users to verify the authenticity of an item prior to, in conjunction with, or after purchase in a virtual experience such as in a VR environment, augmented reality ("AR") environment, video game, website, etc. Further, the configuration reduces the possibility of viable, yet non-authentic, copies of that virtual item. In particular, the configuration uses a decentralized network to store credentials for a virtual item amongst multiple devices. Rather than having the credentials for a virtual item stored in a centralized location such as a server, which provides a single point of security vulnerability for obtaining and copying the credentials, the configuration reduces that risk by storing the credentials on multiple devices.

Figure 1:
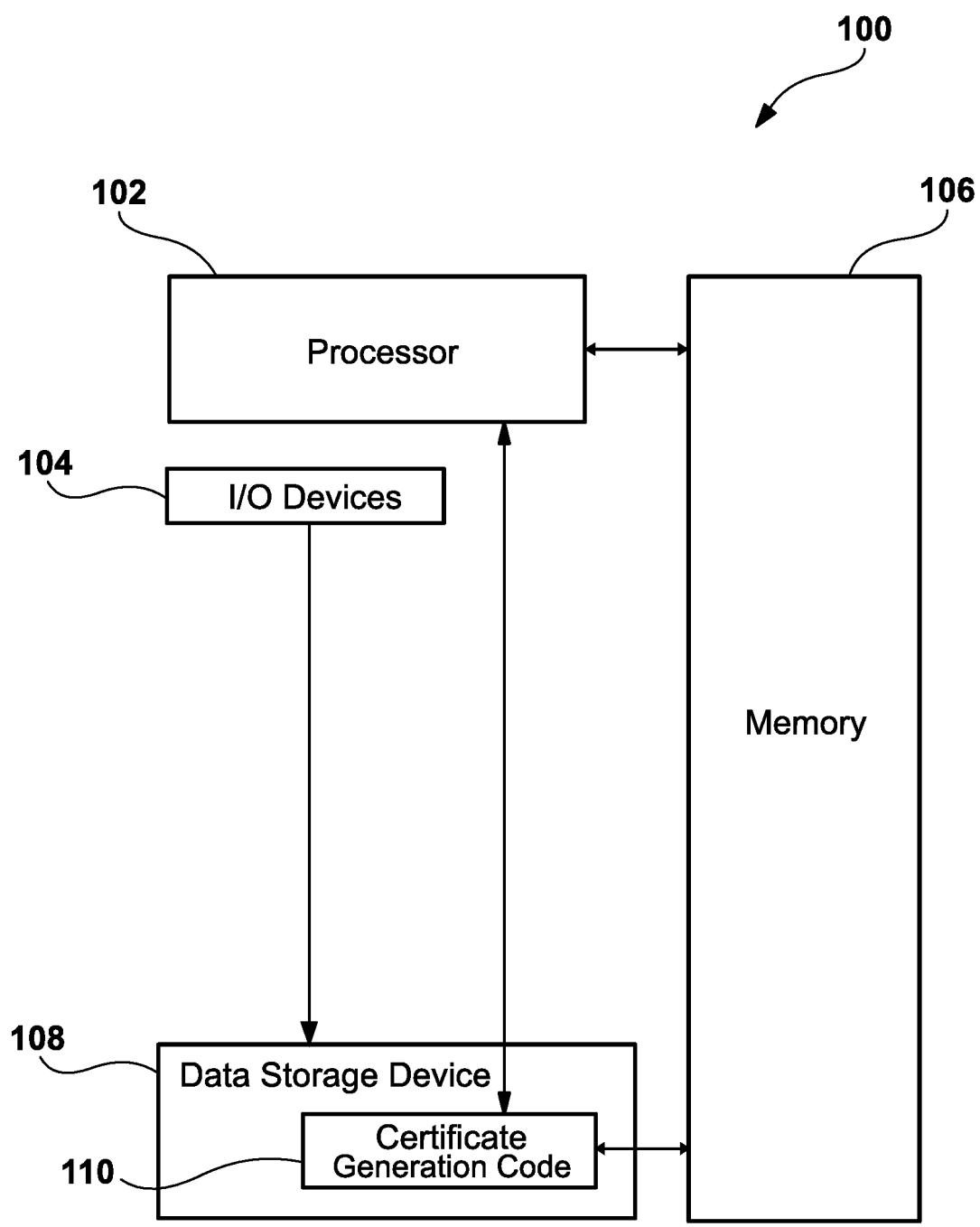
FIG. 1 illustrates a virtual item authentication system that is used to generate authentication credentials for a virtual item.

FIG. 1 illustrates a virtual item authentication system 100 that is used to generate authentication credentials for a virtual item. In one aspect, the virtual item authentication system 100 generates a certificate of authenticity for the virtual item. The virtual item authentication system 100 then distributes the certificate of authenticity to multiple devices. For example, the multiple devices may each store the certificate of authenticity in a blockchain ledger (e.g., a data structure such as a linked list) that includes other certificates of authenticity; each blockchain ledger stored on its corresponding device should match the blockchain ledger stored on the other devices in the decentralized network.

In one aspect, the author of the virtual item has a private key that is used to generate a digital signature that is accompanied with the certificate of authenticity in the blockchain ledgers. To authenticate the certificate of authenticity, the multiple devices may communicate with each other and compare the digital signatures to ensure that the digital signature stored in multiple blockchain ledgers is that of the author.

In one aspect, the blockchain ledger stores the actual certificates of authenticity. In addition, or in the alternative, the blockchain ledger stores transactions that establish a chain of title (i.e., a history transactions effectuating transfer of ownership) for the virtual item.

In another aspect, the blockchain ledger is particular to certificates of authenticity. In yet another aspect, the blockchain ledger may store other types of data and transactions (i.e., not associated with certificates of authenticity) in blocks of the linked list along with the certificates of authenticity.

As illustrated, the virtual item authentication system 100 comprises a processor 102, a memory 106, e.g., random access memory ("RAM") and/or read only memory ("ROM"), a data storage device 108, and various input/output ("I/O") devices 104. The I/O devices 104 (e.g., hand controller, headset, keyboard, mouse, joystick, camera, biometric sensor, mobile device, wearable devices, etc.) may be used by an author to compose the virtual item. For example, the author may draw a virtual painting, sculpt a virtual sculpture, etc. via inputs that are recognized by the I/O devices 104.

After composing the virtual item, the author may also use the I/O devices 104 to provide inputs to certificate of generation code 110 stored on the data storage device 108. As a result, a certificate of authenticity is generated for the virtual item. For example, one of the inputs may be a digital signature performed by the author with the private key of a private-public key encryption pair.

In one aspect, the data storage device 108 loads the certificate generation code 110 from a computer readable storage device, e.g., a magnetic or optical drive, diskette, or non-volatile memory, DVD, CD-ROM, etc. In another aspect, the data storage device 108 is the computer readable storage device. As such, the certificate generation code 110 and associated data structures of the present disclosure may be stored on a computer readable storage device.

The virtual item authentication system 100 improves the functioning of a computing device by reducing the processing time that an authentication system uses to authenticate a virtual item. In contrast with a system expending resources trying to obtain various forms of proof for authenticating a virtual item via third-party intermediaries, which may involve a significant amount of processing time, the virtual item authentication system 100 generates a certificate of authenticity that allows for real-time (i.e., without a perceivable time delay), or substantially real-time, authentication of the virtual item by multiple devices. For example, multiple devices may each independently verify the digital signature of the certificate of authenticity via the public key included in, or with, the certificate of authenticity generated by the processor 102 in a simultaneous (i.e., without a perceivable time delay), or substantially simultaneous, manner. As a result, the decentralized network of multiple devices is a trusted authentication system that independently authenticates the certificate of authenticity without additional resources being expended on communicating with a third-party expert that would manually examine the certificate of authenticity. Therefore, the virtual item authentication system 100 is a technological solution that reduces the processing time for authenticating the certificate of authenticity and realistically allows for a purchase and authentication of a virtual item in real-time or substantially real-time.

Figure 2:
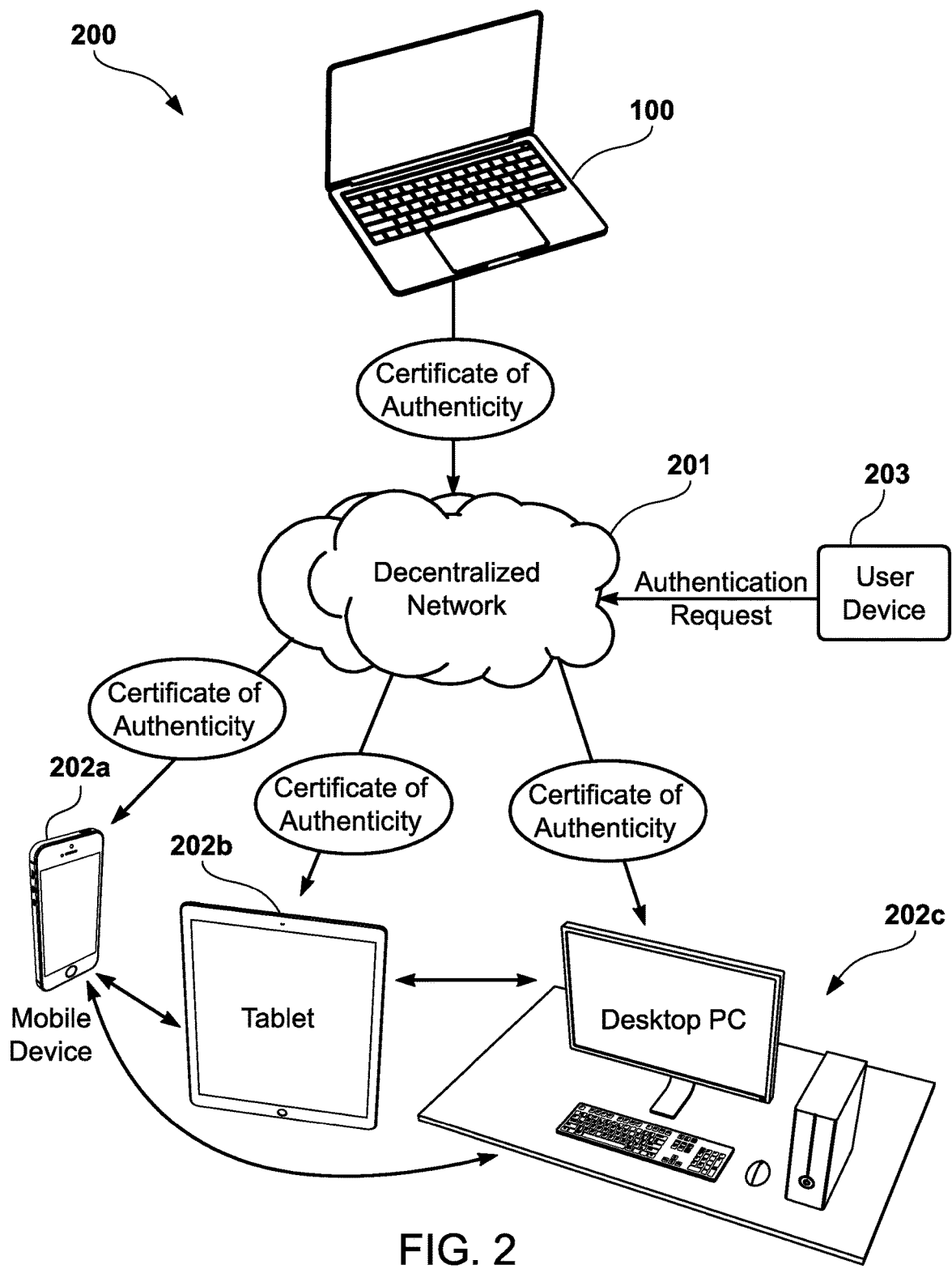
FIG. 2 illustrates a decentralized authentication configuration for authenticating the certificate of authenticity generated by the virtual item authentication system illustrated in FIG. 1.

FIG. 2 illustrates a decentralized authentication configuration 200 for authenticating the certificate of authenticity generated by the virtual item authentication system 100 illustrated in FIG. 1. As an example, the virtual item authentication system 100 is illustrated as a laptop; various other computing devices (e.g., desktop computer, smartphone, tablet device, etc.) may be used instead.

After generating the certificate of authenticity described with respect to FIG. 1, the virtual item authentication system 100 sends the certificate of authenticity, and any associated data (e.g., a digital signature, a public key, etc.), through a decentralized network 201 to various computing devices 202a-202c. In other words, each of the various computing devices 202a-202c stores the certificate of authenticity. Accordingly, the decentralized authentication configuration 200 reduces the possibility of the certificate of authenticity being tampered with or manipulated, which may have occurred if the certificate of authenticity was stored only in one location.

When a user purchases a virtual item, the user may authenticate, via a user device 203, the corresponding certificate of authenticity. For instance, the decentralized authentication configuration 200 may receive an authentication request from the user device 203. Two or more of the computing devices 202a-202c may compare their respective versions of the certificate of authenticity and/or verify the digital signatures of the certificate of authenticity. In other words, the computing devices 202a-202c may communicate with each other to perform a peer-to-peer authentication of the certificate of authenticity. Further, the two or more of the computing devices 202a-202c may also compare other portions of their respective blockchain ledgers—not necessarily associated with the virtual item being authenticated—to ensure that the blockchain as a whole has not been manipulated.

As examples, the computing device 202a is illustrated as a smartphone, the computing device 202b is illustrated as a tablet device, and the computing device 202c is illustrated as a desktop personal computer ("PC"); a variety of other computing devices may be used instead. Further, three computing devices 202a-202c are illustrated only as examples as two or more computing devices 202a-202c may be used in the decentralized authentication configuration 200.

Figure 3:
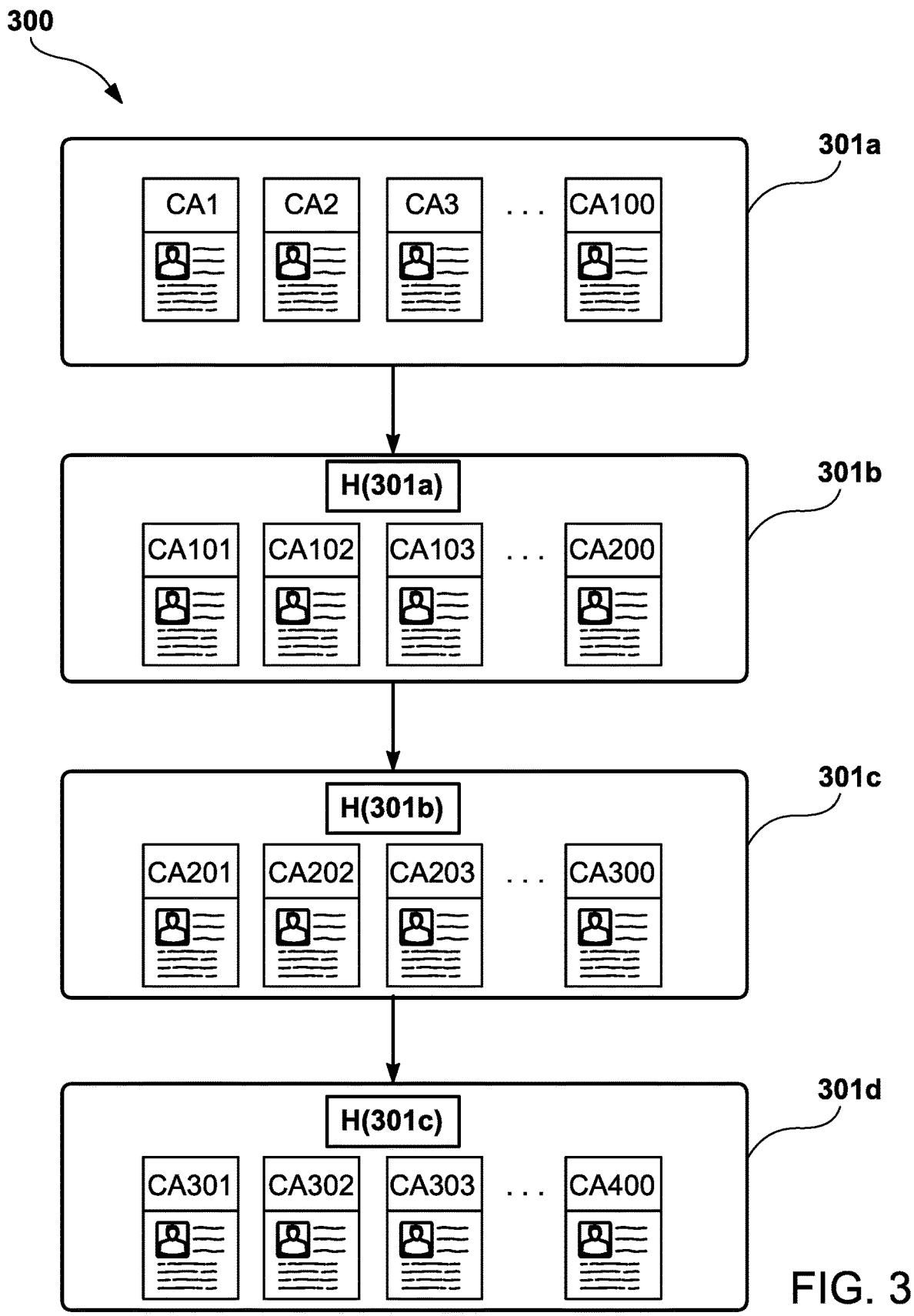
FIG. 3 Illustrates an example of a data structure that may be used by each of the computing devices illustrated in FIG. 2 to store the certificate of authenticity.

FIG. 3 Illustrates an example of a data structure 300 that may be used by each of the computing devices 202a-202c illustrated in FIG. 2 to store the certificate of authenticity. For example, a blockchain in the form of a linked list data structure may have a series of blocks 301a-301d. Each block may store one or more certificates of authenticity. For instance, block 301a (e.g., the oldest block) may store certificates of authenticity one through one hundred, block 301b may store certificates of authenticity one hundred one through two hundred, block 301c may store certificates of authenticity two hundred one through three hundred, and block 301d may store certificates of authenticity three hundred one through four hundred.

In addition, each block may store an authentication parameter (e.g., a hash function) that is based on data from the previous block. For example, block 301b may store a hash function H (block 301a) that is the result of a hash function being performed on all, or some, of the certificate of authenticity data stored in block 301a. Further, block 301c may store the same hash function (or possibly a different Hash function) H (block 301b) that is the result of the hash function being performed on all, or some, of the certificate of authenticity data stored in block 301b. The blockchain mechanism illustrated in FIG. 3 may be used for subsequent blocks as blocks are added to the data structure 300.

Other than verifying the digital signatures of the particular certificate of authenticity that is being authenticated, the computing devices 202a-c (FIG. 2) may also compare hash function results for each of the blocks of their respective data structures 300. For example, the hash function applied to the data of block 301b should equal the same result stored in block 301c for each of the respective data structures 300 stored by the computing devices 202a-c. Therefore, the computing devices 202a-c may traverse their respective data structures 300 (i.e., via pointers stored in each block that point to the next block in the sequence) and compare the hash function results to ensure the integrity of the entire data structure 300. If one or more blocks are compromised in any of the blockchain ledgers, the particular certificate of authenticity for which the user device 203 requests authentication may not be authenticated by the decentralized authentication configuration 200.

In one aspect, each certificate of authenticity is a token. In other words, the token associated with the certificate of authenticity is generated upon the author providing the certificate of authenticity for storage in the data structure 300. Any transactions associated with that token (i.e., a sale of the virtual item and corresponding certificate of authenticity) may then also be recorded in the blockchain ledger so that a chain of title may be established for the virtual item. Accordingly, various forms of consistency criteria (e.g., digital signature verification, blockchain ledger integrity, etc.) may be used to authenticate the certificate of authenticity.

Figure 4A:
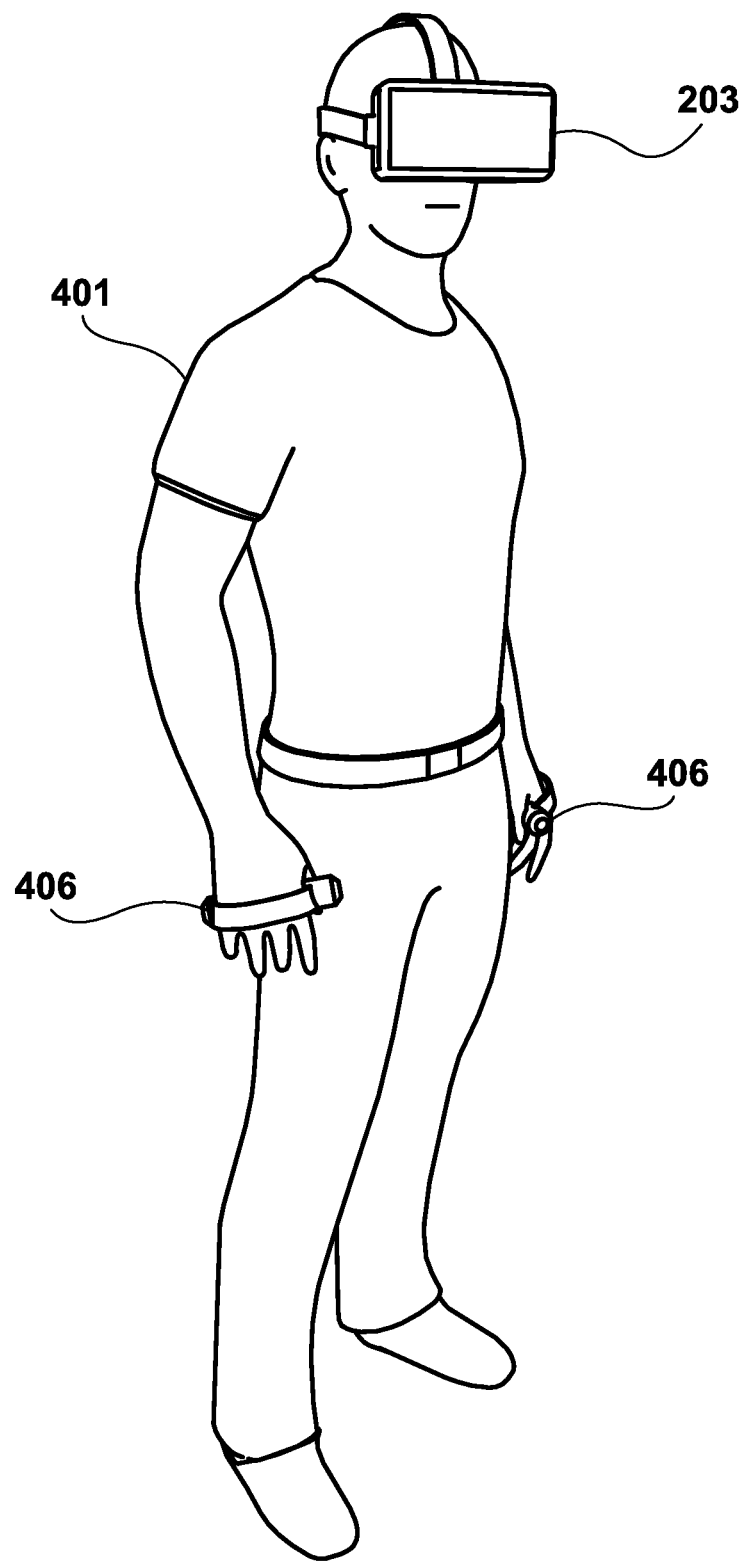
FIG. 4A illustrates the user device illustrated in FIG. 3 being used in a virtual configuration.

FIG. 4A illustrates the user device 203 illustrated in FIG. 3 being used in a virtual configuration 400. For example, the user device 203 may be a VR headset that provides a user 401 with a VR experience via inputs provided by one or more hand controllers 406. Other types of user devices 203 may be used to provide other types of virtual experiences (e.g., AR).

Figure 4B:
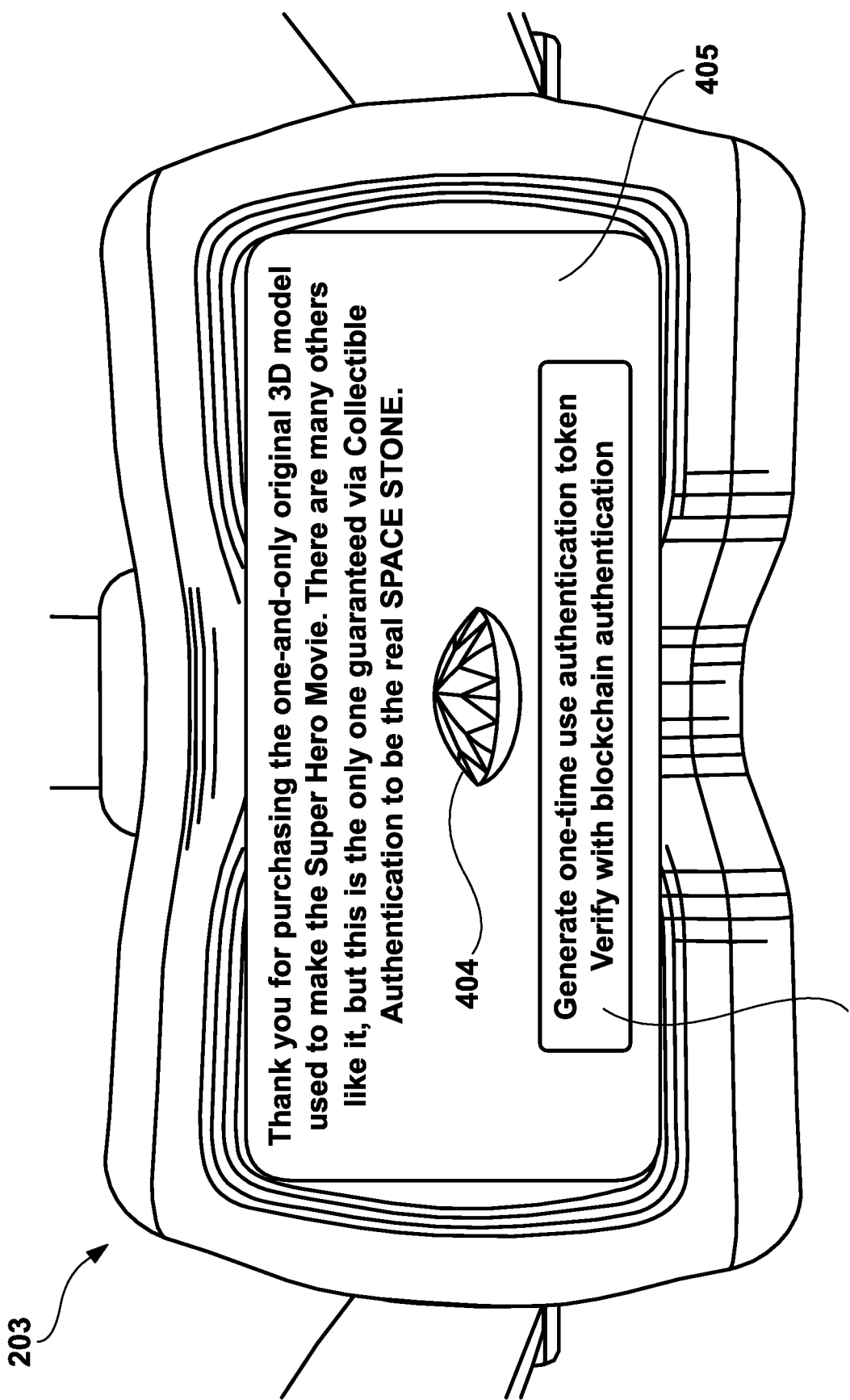
FIG. 4B illustrates an example of a graphical user interface ("GUI") rendered by a display screen inside of the virtual reality ("VR") headset illustrated in FIG. 4A.
Figure 4C:
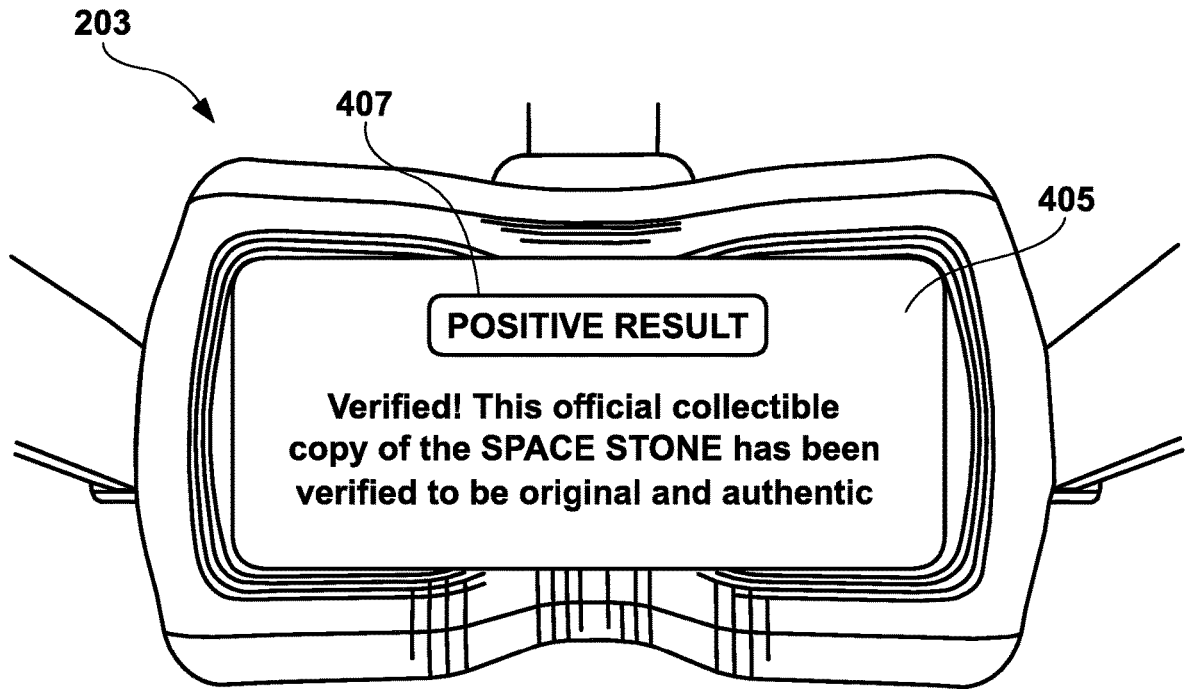
FIG. 4C illustrates the result indicium displaying a positive result that the virtual item is authentic.
Figure 4D:
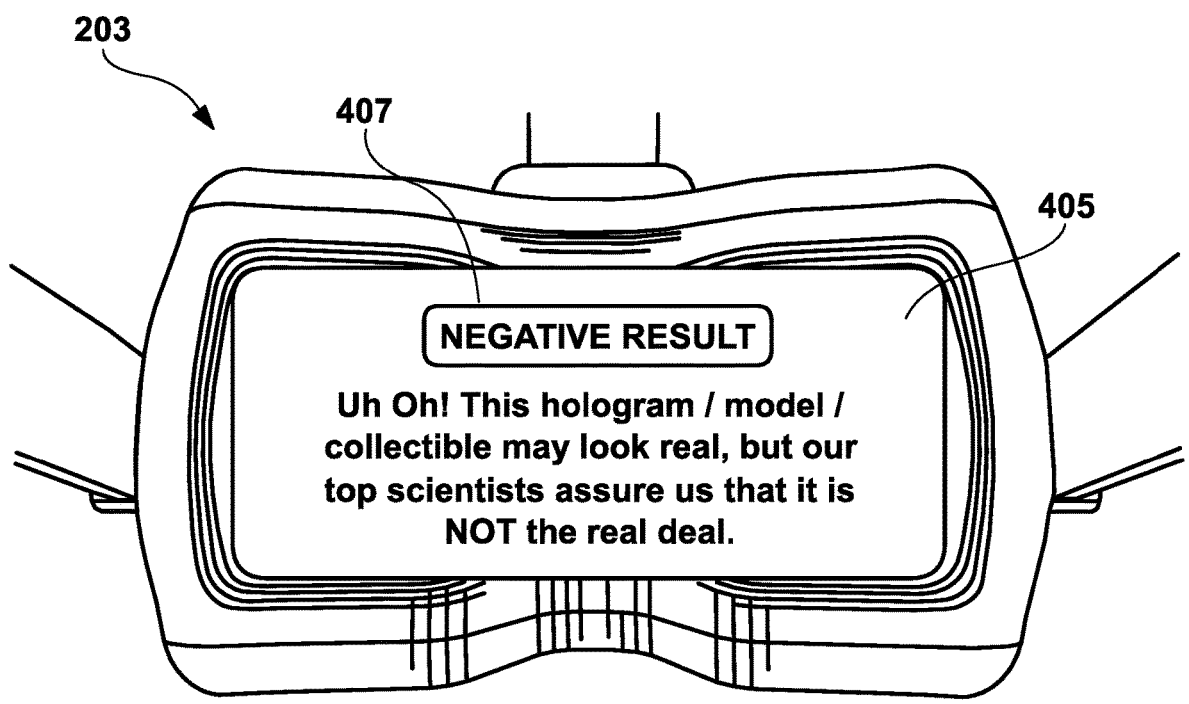
FIG. 4D illustrates the result indicium displaying a negative result that the virtual item is not authentic.

FIG. 4B illustrates an example of a GUI 405 rendered by a display screen inside of the VR headset 203 illustrated in FIG. 4A. The GUI 405 displays an image of a virtual item 404 that the user 401 purchased while immersed in the VR experience provided by the VR headset 203. The user 401 may provide an input (e.g., via a hand controller 406) to select an authentication indicium 402 (e.g., a menu button). After the user selects the authentication indicium 402, the GUI 405 displays a result indicium 407 as to whether or not the virtual item is authentic. For example, FIG. 4C illustrates the result indicium 407 displaying a positive result that the virtual item is authentic. By way of contrast, FIG. 4D illustrates the result indicium 407 displaying a negative result that the virtual item is not authentic.

In another aspect, the GUI 402 may be displayed by a computing device distinct from the VR headset 203. For example, the user 401 may be immersed in a VR experience via the VR headset 203, but then purchase the virtual item at a desktop pc after completion of the VR experience.

Figure 5:
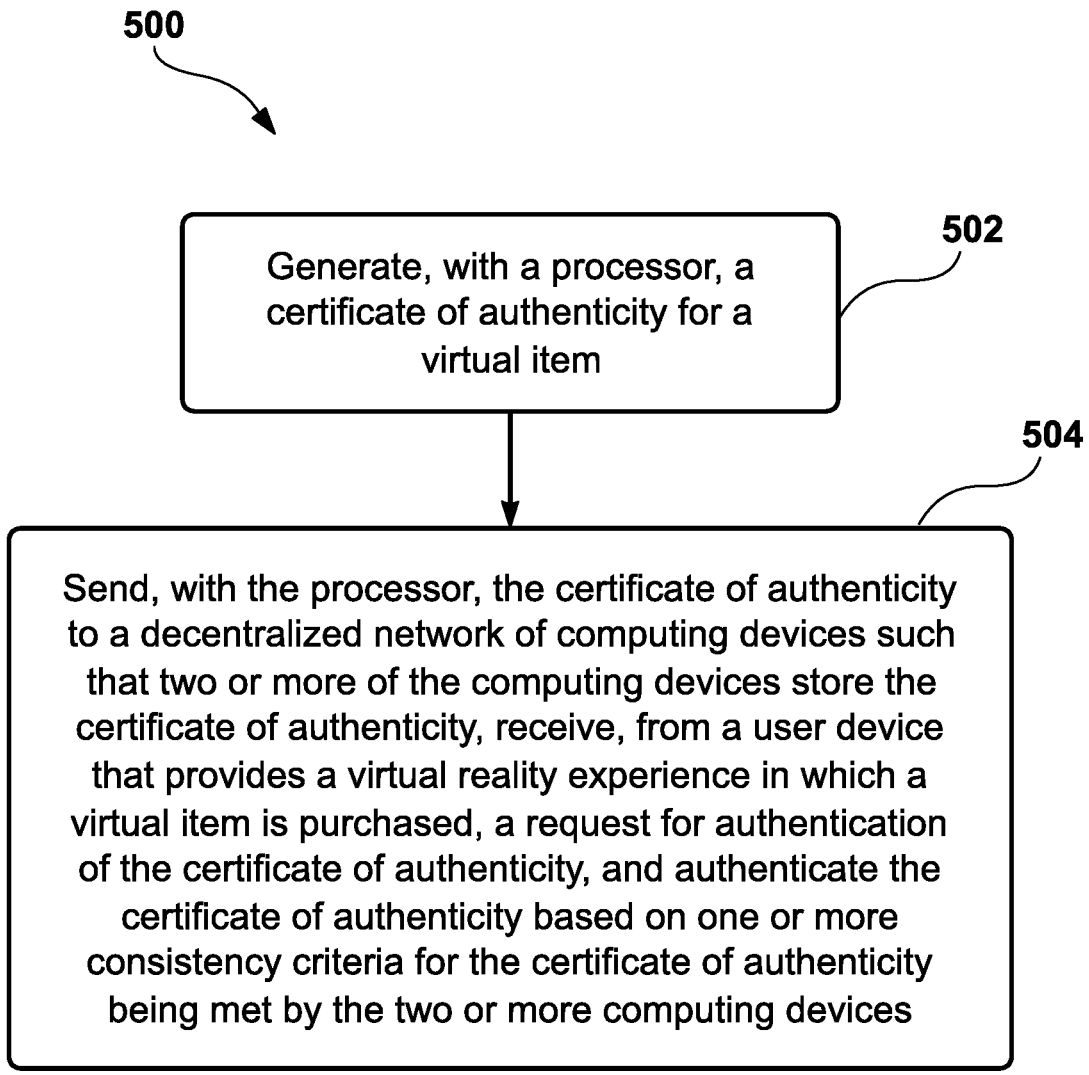
FIG. 5 illustrates a process that may be used to generate the certificate of authenticity.

FIG. 5 illustrates a process 500 that may be used by the processor 102 illustrated in FIG. 1 to generate the certificate of authenticity. At a process block 502, the process 500 generates, with the processor 102, a certificate of authenticity for a virtual item. Further, at a process block 504, the process 500 sends, with the processor 102, the certificate of authenticity to a decentralized network 201 (FIG. 2) of computing devices 202a-c such that two or more of the computing devices 202a-c store the certificate of authenticity. The two or more of the computing devices 202a-c receive, from a user device 203 that provides a VR experience in which a virtual item is purchased, a request for authentication of the certificate of authenticity. In addition, the two or more computing devices 202a-c authenticate the certificate of authenticity based on one or more consistency criteria for the certificate of authenticity being met by the two or more computing devices 202a-c.

Figure 6:
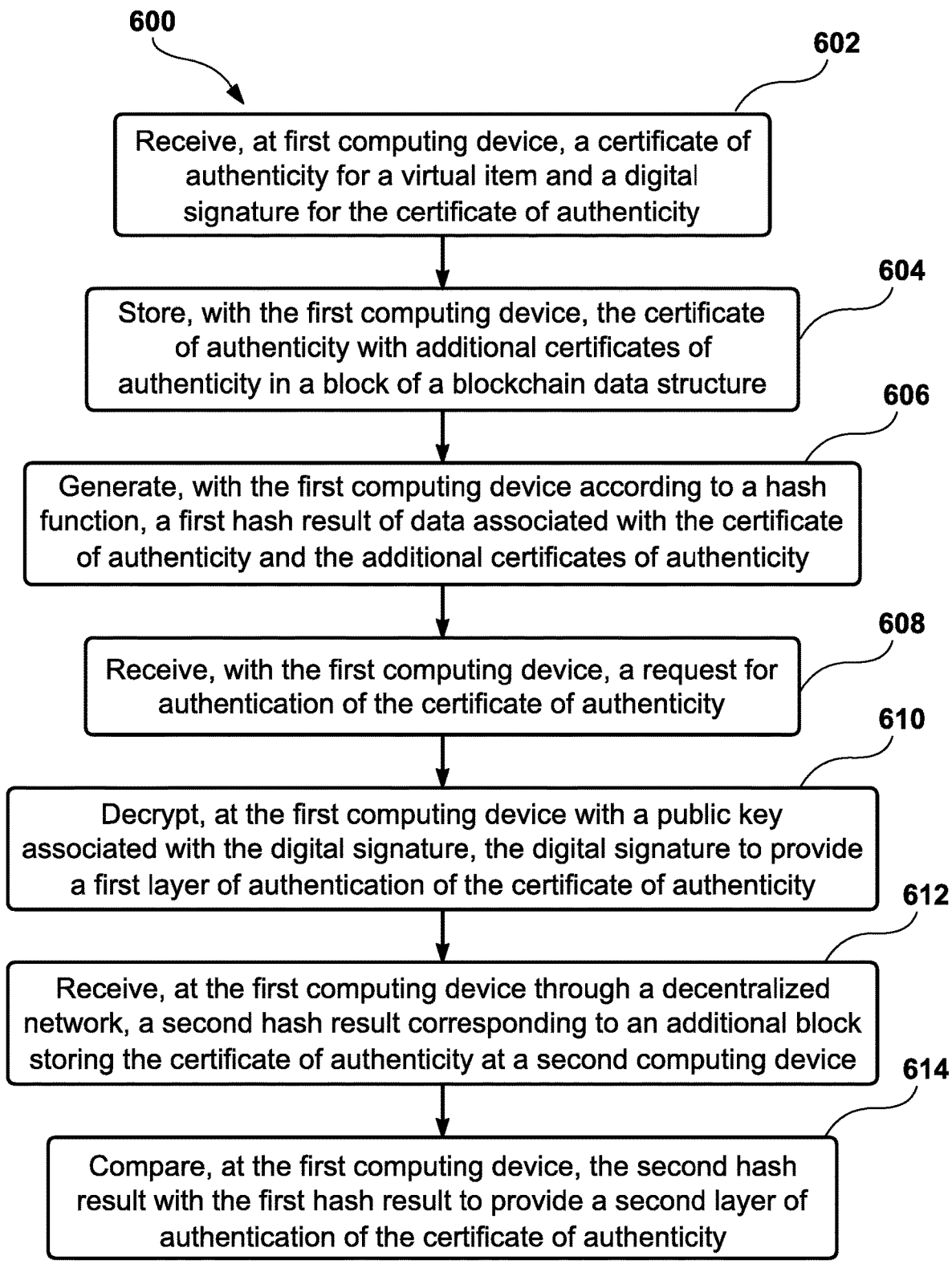
FIG. 6 illustrates a process that may be used to authenticate the certificate of authenticity.

Further, FIG. 6 illustrates a process 600 that may be used to authenticate the certificate of authenticity generated by the processor 102 illustrated in FIG. 1. At a process block 602, the process 600 receives, at first computing device, a certificate of authenticity for a virtual item and a digital signature for the certificate of authenticity. Further, at a process block 604, the process 600 stores, with the first computing device, the certificate of authenticity with additional certificates of authenticity in a block of a blockchain data structure. In addition, at a process block 606, the process 600 generates, with the first computing device according to a hash function, a first hash result of data associated with the certificate of authenticity and the additional certificates of authenticity.

At a process block 608, the process 600 also receives, with the first computing device, a request for authentication of the certificate of authenticity. Further, at a process block 610 the process 600 decrypts, at the first computing device with a public key associated with the digital signature, the digital signature to provide a first layer of authentication of the certificate of authenticity. In addition, at a process block 612, the process 600 receives, at the first computing device through a decentralized network 201 (FIG. 2), a second hash result corresponding to an additional block storing the certificate of authenticity at a second computing device. At a process block 614, the process 600 compares, at the first computing device, the second hash result with the first hash result to provide a second layer of authentication of the certificate of authenticity.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method for authenticating a certificate of authenticity for a virtual reality item comprising:
generating, at an authentication system, the certificate of authenticity for the virtual reality item responsive to creation of the virtual reality item;
transmitting, by the authentication system, the certificate of authenticity to a first computer and a second computer;
receiving, at the first computer, from a user device over a decentralized network, a first request to authenticate the certificate of authenticity, wherein the certificate of authenticity is stored on the first computer;
receiving, at the second computer, from the user device over the decentralized network, a second request to authenticate the certificate of authenticity, wherein the certificate of authenticity is stored on the second computer;

authenticating the certificate of authenticity based on one or more consistency criteria for the certificate of authenticity, wherein authenticating the certificate of authenticity according to a first consistency criterion of the one or more consistency criteria comprises:
   determining, by the first computer, a first hash function result of data associated with the certificate of authenticity, wherein the first hash function result is based on a first block of a first blockchain stored at the first computer, wherein the first blockchain includes sequential blocks, wherein the first block of the first blockchain is located at a first position relative to a last block of the first blockchain;
   receiving, from the second computer, a second hash function result of the data associated with the certificate of authenticity, wherein the second hash function result is based on a second block of a second blockchain stored at the second computer, wherein the second blockchain includes sequential blocks, wherein the second block of the second blockchain is located at a second position relative to a last block of the second blockchain, wherein the first position and the second position are the same relative to the last block of the first blockchain and the last block of the second blockchain, respectively; and
   comparing, with the first computer, the first hash function result with the second hash function result; and based on the first consistency criterion, displaying a user notification on the user device, wherein the user notification confirms or refutes an authenticity of the certificate of authenticity for the virtual reality item.

2. The method of claim 1, wherein the certificate of authenticity is stored in a block of the first blockchain.

3. The method of claim 1, wherein the certificate of authenticity is stored in the first block and the second block.

4. The method of claim 1, further comprising:
   providing a private key and a public key together forming a private-public key pair;
   generating a digital signature of the certificate of authenticity with the private key.

5. The method of claim 4, further comprising authenticating the certificate of authenticity according to a second consistency criterion of the one or more consistency criteria, wherein authenticating the certificate of authenticity according to the second consistency criterion comprises:
   decrypting, with the first computer, the digital signature of the certificate of authenticity using the public key.

6. The method of claim 1, further comprising receiving, from the user device, a request to purchase the virtual reality item.

7. A system comprising:
   a first computer;
   an authentication system configured to generate a certificate of authenticity for a virtual reality item responsive to creation of the virtual reality item and to transmit the certificate of authenticity to the first computer;
   a second computer different from the authentication system and the first computer, wherein the first and second computers are in communication with one another via a decentralized network, wherein the second computer receives a request to authenticate the certificate of authenticity from a user device over the decentralized network; and
   wherein the first computer is configured to:
      receive the request to authenticate the certificate of authenticity, wherein the first computer receives the request to authenticate the certificate of authenticity from the user device over the decentralized network;
      authenticate the certificate of authenticity based on one or more consistency criteria for the certificate of authenticity, wherein authenticating the certificate of authenticity according to a first consistency criterion of the one or more consistency criteria comprises:
         determining, by the first computer, a first hash function result of data associated with the certificate of authenticity, wherein the first hash function is based on a first block of a first blockchain stored at the first computer, wherein the first blockchain includes sequential blocks, wherein the first block of the first blockchain is located at a first position relative to a first terminating block of the first blockchain;
         receiving, from the second computer, a second hash function result of the data associated with the certificate of authenticity by the second computer, wherein the second hash function result is based on a second block of a second blockchain stored at the second computer, wherein the second blockchain includes sequential blocks, wherein the second block of the second blockchain is located at a second position relative to a last block of the second blockchain, wherein the first position and the second position are the same relative to the last block of the first blockchain and the last block of the second blockchain, respectively; and
         comparing, with the first computer, the first hash function result with the second hash function result; and
      confirm an authenticity of the certificate of authenticity for the virtual reality item based on the first consistency criterion.

8. The system of claim 7, wherein the certificate of authenticity is stored in a block of the first blockchain.

9. The system of claim 7, wherein the certificate of authenticity is stored in the first block and the second block.

10. The system of claim 7, wherein the certificate of authenticity is stored in a block of the first blockchain, and the first block includes a pointer with an address of the block in which the certificate of authenticity is stored.

11. The system of claim 7, further comprising:
   a private key and a public key together forming a private-public key pair, wherein the private key is configured to be used to generate a digital signature of the certificate of authenticity.

12. The system of claim 11, wherein the first computer is further configured to authenticate the certificate of authenticity according to a second consistency criterion of the one or more consistency criteria by decrypting the digital signature of the certificate of authenticity using the public key.

13. One or more non-transitory computer-readable storage media, the non-transitory computer-readable storage media storing computer-executable code that, when executed by one or more processors of respective computing resources causes the one or more processors to:
   generate, at an authentication system comprising at least a first computing resource of the respective computing resources, a certificate of authenticity for a virtual reality item responsive to creation of the virtual reality item;
   transmit, by the authentication system, the certificate of authenticity to a first computer and a second computer, wherein the first computer comprises at least a second computing resource of the respective computing resources and the second computer comprises at least a third computing resource of the respective computing resources;
receive, at the first computer, from a user device over a decentralized network, a request to authenticate the certificate of authenticity, wherein the certificate of authenticity is stored on the first computer;
receive, at the second computer, from the user device over the decentralized network, a second request to authenticate the certificate of authenticity, wherein the certificate of authenticity is stored on the second computer;
authenticate the certificate of authenticity based on one or more consistency criteria for the certificate of authenticity, wherein authenticating the certificate of authenticity according to a consistency criterion of the one or more consistency criteria comprises:
  determining, by the first computer, a first hash function result of data associated with the certificate of authenticity, wherein the first hash function result is based on a first block of a first blockchain stored at the first computer, wherein the first blockchain includes sequential blocks, wherein the first block of the first blockchain is located at a first position relative to a last block of the first blockchain;
  receiving, from the second computer, a second hash function result of the data associated with the certificate of authenticity, wherein the second hash function result is based on a second block of a second blockchain stored at the second computer, wherein the second blockchain includes sequential blocks, wherein the second block of the second blockchain is located at a second position relative to a last block of the second blockchain, wherein the first position and the second position are the same relative to the last block of the first blockchain and the last block of the second blockchain, respectively; and
  comparing, with the first computer, the first hash function result with the second hash function result; and
  based on the consistency criterion, display a user notification on the user device, wherein the user notification confirms or refutes an authenticity of the certificate of authenticity for the virtual reality item.

14. The non-transitory computer-readable storage media of claim 13, wherein the certificate of authenticity is stored in a block of the first blockchain.

15. The non-transitory computer-readable storage media of claim 13, wherein the certificate of authenticity is stored in the first block and the second block.

16. The non-transitory computer-readable storage media of claim 13, wherein the computer-executable code, when executed by the one or more processors, further causes the one or more processors to:
  provide a private key and a public key together forming a private-public key pair; and
  generate a digital signature of the certificate of authenticity with the private key.

17. The non-transitory computer-readable storage media of claim 16, wherein the computer-executable code, when executed by the one or more processors, further causes the one or more processors to authenticate the certificate of authenticity according to a second consistency criterion of the one or more consistency criteria, wherein authenticating the certificate of authenticity according to the second consistency criterion comprises:
  decrypting, with the first computer, the digital signature of the certificate of authenticity using the public key.

18. The non-transitory computer-readable storage media of claim 13, wherein the computer-executable code, when executed by the one or more processors, further causes the one or more processors to receive, from the user device, a request to purchase the virtual reality item.

* * * * *